Oct. 28, 1930.  E. G. GOODELL  1,779,536
METHOD OF DEHYDRATING BLACK LIQUOR
Filed April 1, 1929
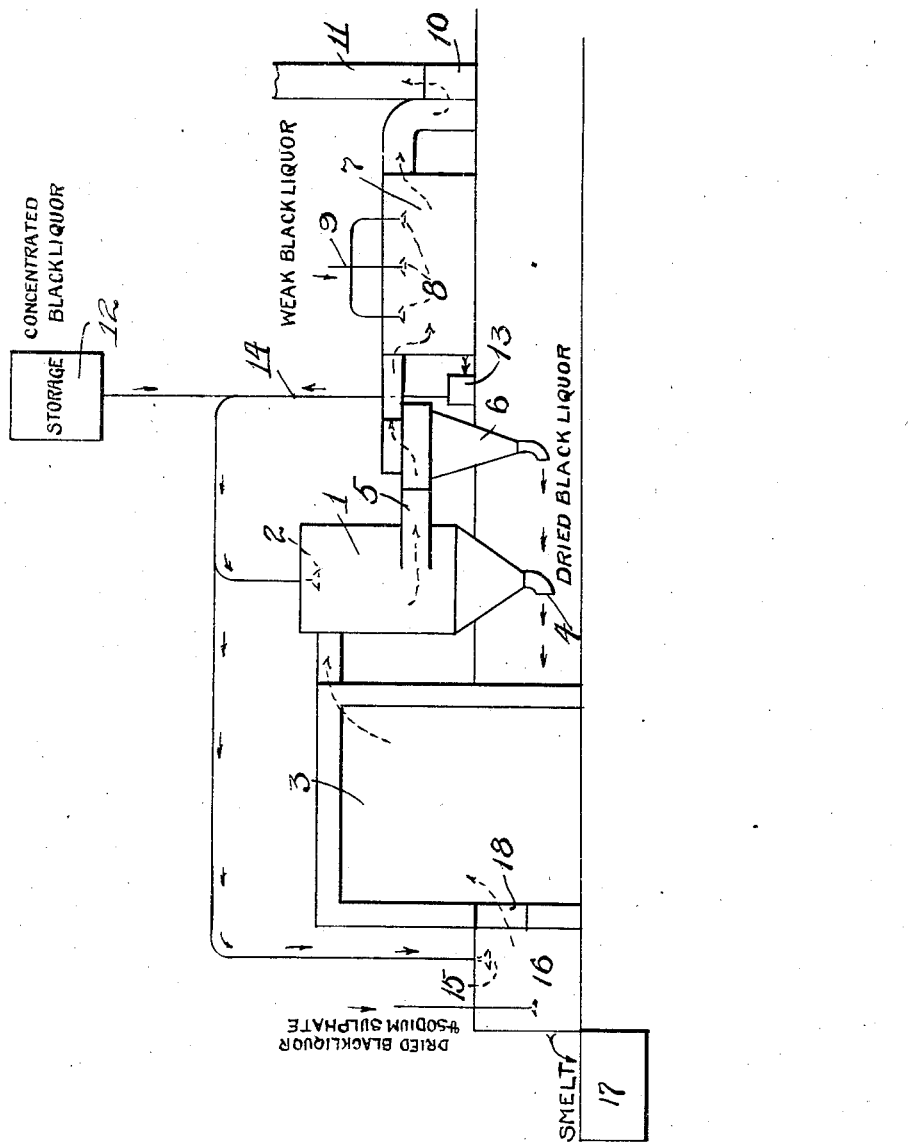
Inventor
Edward G. Goodell Patented Oct. 28, 1930

1,779,536

UNITED STATES PATENT OFFICE

EDWARD G. GOODELL, OF STEVENS POINT, WISCONSIN

METHOD OF DEHYDRATING BLACK LIQUOR

Application filed April 1, 1929. Serial No. 351,660.

This invention relates to a method of dehydrating black liquor.

As disclosed in my copending application, entitled "Process of treating black liquor", Serial No. 329,385, very material advantages over the usual method of burning black liquor are obtained by employing my method of spray drying the black liquor in a gaseous medium to produce a substantially dry solid material in finely divided condition and high in organic content and then reducing the sulphate content of this material under properly regulated conditions.

I have found, however, that my process may be further improved and still greater heat economies effected. For instance, in my previously disclosed process, it has been necessary, using a single spray drying chamber, in order to obtain a substantially dry product having a high available heat value to allow the gases from said chamber to leave with a fairly low moisture content, substantially below their saturation point, and consequently with a large unrealized drying or evaporative capacity.

It is, therefore, an object of my present invention to utilize to a fuller extent the drying capacity of the gases used in the dehydration of the black liquor.

It is a further important object of this invention to provide for a more efficient and complete recovery of the dried black liquor.

Other and further important objects of this invention will become apparent from the following description and appended claim.

My process in its preferred embodiment is best described in connection with the accompanying drawing, wherein the apparatus and flow of materials are shown diagrammatically.

The reference numeral 1 indicates a main dehydrating cell provided with a spray device 2 by means of which partially concentrated black liquor is sprayed in finely divided form into a current, or currents, of a gaseous drying medium conducted from a steam generating device, such as a boiler 3. In the dehydrating cell 1 the sprayed black liquor is converted into a substantially dry solid material, or powder, containing practically all of the solid constituents of the black liquor and high in organic content and heat value. This dried black liquor is collected from the bottom of the dehydrating cell 1, as at 4, through a valved opening.

The waste gases, which are still relatively unsaturated, pass out of the cell 1 through a conduit 5 into a dust separator 6 of any standard type, from the bottom of which additional quantities of dried powder are recovered.

According to my present invention the evaporative capacity of the exit gases from the dust separator 6 is further utilized in a secondary spray chamber or chambers 7 for effecting a partial concentration of weak, black liquor introduced into said chamber 7 by means of one or more spray devices 8, said devices 8 being connected by pipes 9 to a source of weak block liquor of say 12° to 25° Beaumé. The now completely, or nearly completely, saturated and substantially cooled gases are drawn from the chamber 7 by means of an induction fan 10 and exhausted through a stack 11.

The partially concentrated black liquor from chamber 7 is pumped from said secondary drying unit into the main spray drier 1, or into a reserve storage tank 12 by means of a pump 13 and piping 14, or, depending upon operating conditions, said concentrated black liquor may be pumped directly to a spray head 15 in a smelting furnace 16.

The dried black liquor from the dehydrating cell 1 and dust collector 6 is mixed with sodium sulphate and charged into said smelting furnace 16, where, under the temperatures and conditions obtaining the organic constituents are burned, the inorganic sodium compounds are melted and a reduction of the sulphate (added as sodium sulphate and present in the black liquor) to sulphide is effected. The resulting molten sodium compounds run out of the smelting furnace into a dissolving tank 17. The hot gases and products of combustion from the smelting furnace 16 pass through a flue 18 into the boiler housing 3 and thence, as aforesaid, through the main and secondary dehydrating units, giving up their sensible heat in the evaporation of the black liquor until they are finally discharged in a substantially saturated and cooled condition.

It will thus be appreciated that my method provides for the full utilization of the heat values contained in the black liquor and resulting gaseous products of combustion, while at the same time the process results in a substantially dried black liquor suitably adapted for the reduction steps. Furthermore, the effect of employing a secondary spraying unit is not only to obtain a preliminary concentration of the black liquor, but also to recover such fine particles of the dried black liquor as would escape separation in the dust separator 6 and would otherwise be lost.

My invention thus accomplishes the three-fold object of concentrating the weak black liquor to a density suitable for delivery to the main spray drier 1, of recovering valuable dust carried out of the dust separator 6, and of utilizing the full evaporative capacity of the heated gases from the burning of the black liquor.

I am aware that many changes may be made and numerous details of my process may be varied through a wide range without departing from the principles of this invention, and I, therefore, do not purpose limiting the patent granted hereon otherwise than necessitated by the prior art.

I claim as my invention:

The process of dehydrating black liquor, which comprises heating a dried black liquor product and concentrated black liquor in a finely divided form, burning the resulting volatile gases in the presence of a steam generator, passing the hot gaseous products of combustion in a separate operation into contact with concentrated black liquor in finely divided form to substantially dehydrate said black liquor without substantial change in its organic content and without substantially saturating said gaseous medium, recovering said dehydrated black liquor as a finely divided practically moisture-free powder, passing said unsaturated gaseous medium into contact with relatively unconcentrated black liquor to effect its concentration and supplying said powder and a portion of the thus concentrated black liquor for the heating step first mentioned.

In testimony whereof I have hereunto subscribed my name at Stevens Point, Portage County, Wisconsin.

EDWARD G. GOODELL.